M. R. HUTCHISON.
SPOOL.
APPLICATION FILED DEC. 22, 1917.

1,345,190.

Patented June 29, 1920.

Inventor
Miller Reese Hutchison
By his Attorney
Clifford E...

UNITED STATES PATENT OFFICE.

MILLER REESE HUTCHISON, OF WEST ORANGE, NEW JERSEY.

SPOOL.

1,345,190.         Specification of Letters Patent.         Patented June 29, 1920.

Original application filed February 2, 1917, Serial No. 146,061. Divided and this application filed December 22, 1917. Serial No. 208,341.

*To all whom it may concern:*

Be it known that I, MILLER REESE HUTCHISON, a citizen of the United States, residing at West Orange, in the county of Essex and State of New Jersey, have invented certain new and useful Improvements in Spools, of which the following is a specification.

This application is a division of my copending application, Serial No. 146,061, filed February 2, 1917, for paper fastening machines.

The invention comprises a spool which may be readily applied to or taken away from the machine, means having been provided whereby the spool may be readily fixed in position, at the same time permitting the material carried thereby to be easily unwound.

In addition, means have been provided for maintaining the spool under tension—that is to say, rotation of the spool on its support is retarded by tension means, so that the wire or whatever material be upon the spool, will be placed under tension as it is unwound.

In the accompanying drawing—

Figure 1:
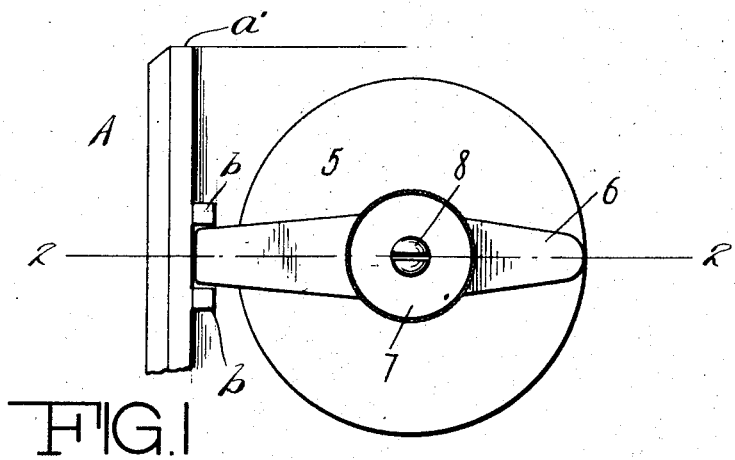

Figure 1 is a plan view of the spool; and

Figure 2:
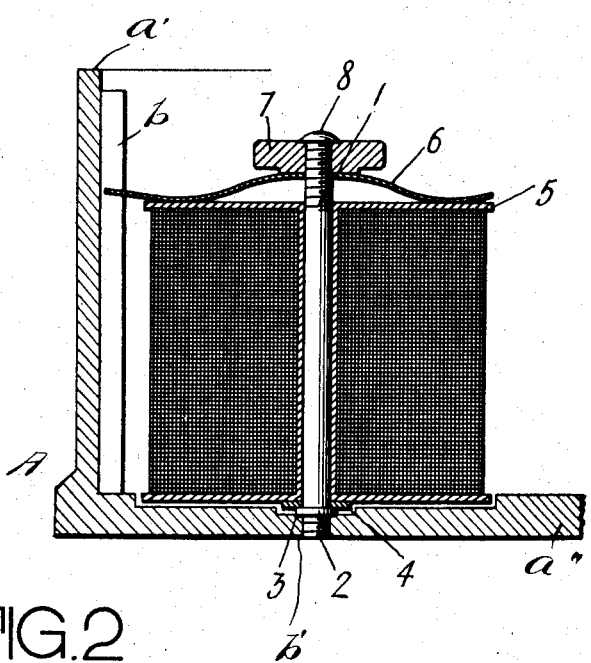

Fig. 2 a sectional elevational view of the apparatus of Fig. 1, taken on the line 2—2—.

The frame of a machine, in which the spool of this invention is adapted to be used is indicated at A. This frame includes two walls $a'$ and $a''$ at substantially right angles to one another, the wall $a'$ being provided with two ribs $b$—$b$, integral therewith, and the wall $a''$ with a threaded aperture $b'$ to receive the threaded end 2 of a stud 1. This stud is provided with an annular collar or shoulder 3 for supporting an antifriction washer 4. A rotatable member or spool 5 is loosely mounted on the stud 1 and rests upon the washer 4. A tension device is carried on the upper end of the stud above the spool 5 and in the present embodiment this device includes a flat spring member 6 bent to the shape shown. The tension in the spring is adjusted by means of a knurled nut 7 threaded to the stud 1. The upper end of the stud is preferably spun over to form a head 8 which is slotted as shown in Fig. 1. By this construction, after the parts have been once assembled, they cannot be readily taken apart, but are removed from, or replaced in, the machine as a unit. The ends of the spring 6 are not symmetrical, one end 9 being longer than the other and projecting between the ribs $b$—$b$ of the frame A. This prevents rotation of the spring and, as a consequence, the friction is between the spool and the spring.

Having thus described my invention what I claim as new and desire to secure by Letters Patent of the United States, is:

1. A magazine mechanism comprising a stud member, a member rotatably mounted thereon, a collar formed at or near one end of said stud, a washer for supporting said rotatable member and mounted on the stud adjacent said collar, the washer having movement relative to the rotatable member, means integral with the stud for preventing removal of the rotatable member and washer therefrom, and stationary means to impose a drag upon the rotatable member.

2. A magazine or spool comprising a stud member having mounted thereon a rotatable member, the stud forming a bearing therefor, a collar formed near one end of the stud, a washer upon said collar forming a support for the rotatable member, the washer and rotatable member having movement relative to each other and to the collar, a tension device including a spring member and an adjustable nut for regulating the amount of friction placed upon the head of the rotatable member, and means integral with the stud to prevent removal of the rotatable member and tension device, said spring member being provided with means to coöperate with a stationary element to prevent rotation of the spring.

3. A magazine or spool comprising a stud member having mounted thereon a rotatable member, a shoulder formed adjacent to one end of the stud, a washer on the stud adjacent the shoulder and having movement relative to the rotatable member which it supports, a tension device including a spring one end of which extends beyond the periphery of the rotatable member for engagement with a stationary element to prevent rotation of the spring member and a knurled nut adjacent the spring member, the rotatable member being placed intermediate said spring member and washer, and the end of said stud opposite to the shoulder being spun over to prevent removal of the rotatable member and tension device.

4. A magazine or spool comprising a stud member having mounted thereon a rotatable member, a projection adjacent to one end of the stud forming a support for the rotatable member, a washer adjacent said projection and having movement relative to the rotatable member and projection, and a tension device including a spring member one end of which extends beyond the periphery of the rotatable member for engagement with a stationary element to prevent rotation of the spring and an adjustable means for regulating the tension of said spring, and means integral with each end of said stud to prevent removal of the rotatable member therefrom.

5. A magazine or spool comprising a stud member having mounted thereon a rotatable member, a stationary tension device frictionally engaging said rotatable member and mounted on the stud, and means integral with the stud for preventing removal of the rotatable member and tension device therefrom.

6. A wire magazine comprising a stud member having mounted thereon a wire containing spool; said spool being supported by a collar formed at one end of said stud; and a tensioning device including a spring member which frictionally reacts against the other end of the spool, one end of the spring projecting beyond the edge of the spool to provide means to coöperate with a stationary element to prevent rotation of the spring, and an adjustable means for regulating the tension of said spring.

7. A wire magazine comprising a stud member having mounted thereon a wire containing spool; one end of said stud member being threaded while the other end is spun over, a collar formed adjacent to the threaded end, a washer placed upon said collar, a wire containing spool placed adjacent said washer, and a tensioning device including a spring member which frictionally reacts against the other end of the spool, one end of the spring projecting beyond the edge of the spool to provide means to coöperate with a stationary element to prevent rotation of the spring, and an adjustable nut for regulating the amount of friction placed upon the head of said spool.

MILLER REESE HUTCHISON.